(Model.)
F. LANDERS.
EMERY WHEEL FOR GRINDING TWIST DRILLS AND OTHER TOOLS.
No. 288,069. Patented Nov. 6, 1883.
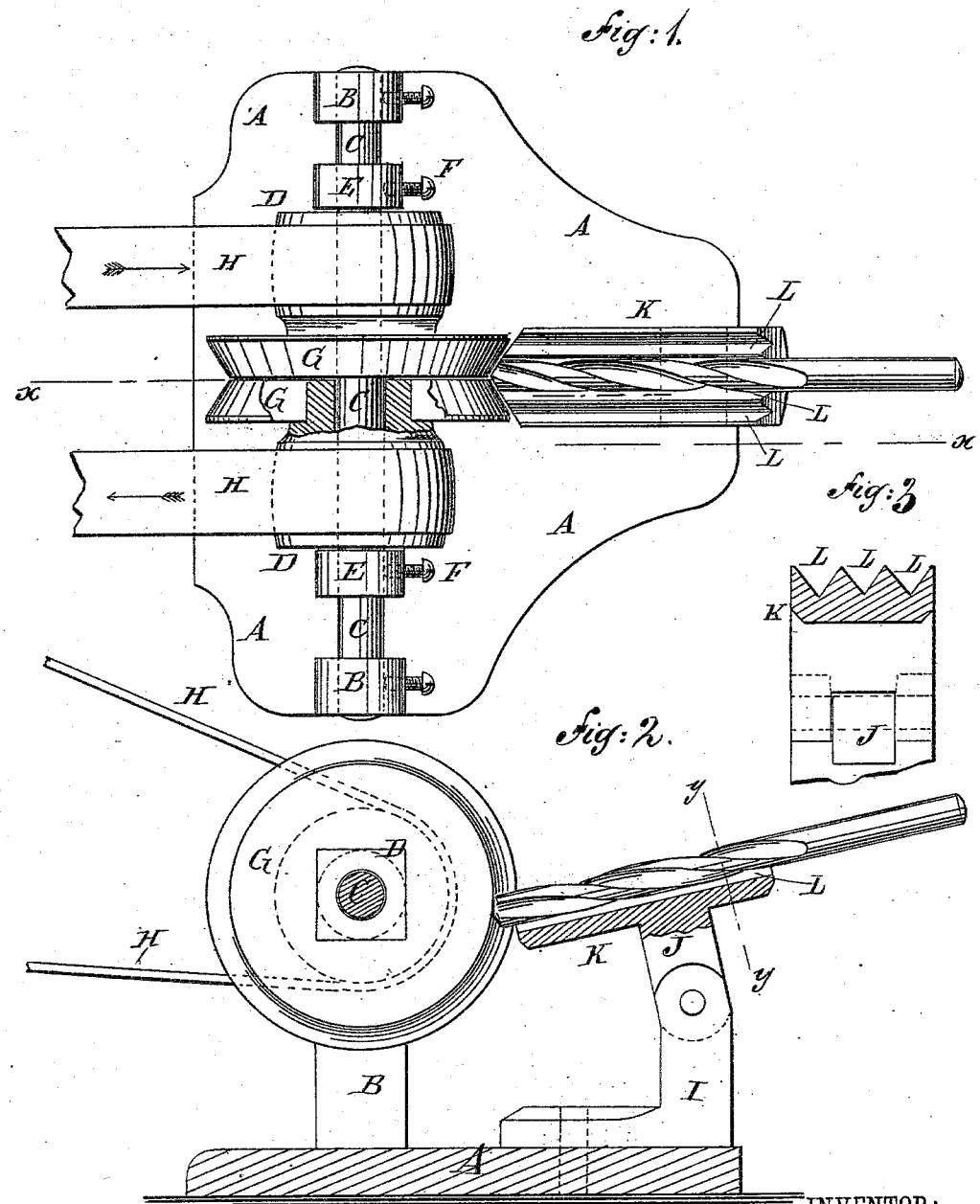
WITNESSES:
Chas. Nide
C. Sedgwick
INVENTOR:
F. Landers
BY Munn & Co
ATTORNEYS.

UNITED STATES PATENT OFFICE.

FRANCIS LANDERS, OF STROUDSBURG, PENNSYLVANIA.

EMERY-WHEEL FOR GRINDING TWIST-DRILLS AND OTHER TOOLS.

SPECIFICATION forming part of Letters Patent No. 288,069, dated November 6, 1883.

Application filed April 13, 1883. (Model.)

*To all whom it may concern:*

Be it known that I, FRANCIS LANDERS, of Stroudsburg, in the county of Monroe and State of Pennsylvania, have invented a new and useful Improvement in Emery-Wheels for Grinding Twist-Drills and other Tools, of which the following is a full, clear, and exact description.

Reference is to be had to the accompanying drawings, forming a part of this specification, in which similar letters of reference indicate corresponding parts in all the figures.

Figure 1 is a plan view of my improvement, partly in section. Fig. 2 is a sectional side elevation of the same, taken through the line *x x*, Fig. 1. Fig. 3 is a sectional elevation of the tool-rest, taken through the line *y y*, Fig. 2.

The object of this invention is to facilitate the accurate grinding of twist-drills and other tools.

The emery-wheels are arranged in pairs, with their faces inclined toward each other, and are attached to the adjacent ends of belt-driven pulleys, revolving in opposite directions, upon a stationary shaft attached to a frame, so that both edges of a drill can be ground at the same time and to the same taper. The machine is provided with a hinged tool-rest having tool-receiving grooves in its face, whereby the tool can be readily brought into and held in position to be ground, as will be hereinafter fully described.

A represents the bed-plate of the machine, to the side parts of which are attached, or upon them are formed, standards B.

To the upper ends of the standards B are secured the ends of a shaft, C, upon which revolve two pulleys, D. The pulleys D are kept in place upon the shaft C by collars E and set-screws F, or other suitable means. The inner ends of the hubs of the pulleys D are squared to fit into square apertures in the centers of the emery-wheels G, or to them are otherwise secured the said emery-wheels. The pulleys D and emery-wheels G are so arranged that the inner sides of the said emery-wheels will be close together. The faces of the emery-wheels G are beveled or inclined inward at such an angle as will give the required inclination to the edge of the tools. The pulleys D and emery-wheels G are driven by belts H in opposite directions, as indicated by the arrows in Fig. 1.

To the forward part of the bed-plate A is secured a standard, I, to the upper end of which is hinged a lug, J, formed upon the lower side of the tool-rest K.

In the upper side of the tool-rest K are formed three grooves, L, to receive the tools to be ground, the central groove being intended to receive drills and other tools that are to be ground with a conical face, and the side grooves being intended to receive tools that are to be ground with an inclined face.

In using the machine, the tool to be ground is laid upon the rest K, and the said rest is turned upon its hinge to bring the forward end of the tool into proper position against the beveled faces of the emery-wheels G, as indicated in Figs. 1 and 2.

Having thus fully described my invention, I claim as new and desire to secure by Letters Patent—

1. The combination, with the frame A B and stationary shaft C, of the pulleys D and the two emery-wheels G, having their faces beveled toward each other, substantially as herein shown and described, whereby both edges of a drill can be ground at the same time and to the same taper, as set forth.

2. The combination, with the emery-wheels G, having inclined faces, of the hinged tool-rest K, having tool-receiving grooves L in its face, substantially as herein shown and described, whereby the tool can be readily brought into and held in position to be ground, as set forth.

FRANCIS LANDERS.

Witnesses:
JOHN S. FISHER,
B. S. JACOBY.